United States Patent
Patel et al.

(10) Patent No.: US 10,841,640 B2
(45) Date of Patent: Nov. 17, 2020

(54) METHODS AND SYSTEMS FOR DISPLAYING CONTENT BASED ON PREFERENCE INFORMATION

(71) Applicant: COMCAST CABLE COMMUNICATIONS, LLC, Philadelphia, PA (US)

(72) Inventors: Mehul Patel, Centennial, CO (US); Edward David Monnerat, Highlands Ranch, CO (US); Nicholas Adam Pinckernell, Littleton, CO (US); Jonathan Alan Leech, Denver, CO (US); Jasbir Rajpal, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/532,288

(22) Filed: Nov. 4, 2014

(65) Prior Publication Data
US 2016/0127763 A1    May 5, 2016

(51) Int. Cl.
*H04N 21/431* (2011.01)
*H04N 21/462* (2011.01)
*H04N 21/45* (2011.01)
*H04N 21/41* (2011.01)

(52) U.S. Cl.
CPC ..... *H04N 21/4312* (2013.01); *H04N 21/4122* (2013.01); *H04N 21/4316* (2013.01); *H04N 21/4532* (2013.01); *H04N 21/4622* (2013.01)

(58) Field of Classification Search
CPC ................................................ H04N 21/4312
See application file for complete search history.

(56) References Cited

U.S. PATENT DOCUMENTS

| | | | |
|---|---|---|---|
| 7,272,657 B2 * | 9/2007 | Allen | H04L 12/1822 709/228 |
| 10,021,448 B2 * | 7/2018 | Gratton | H04N 21/43615 |
| 10,255,353 B2 * | 4/2019 | Tsunoda | H04N 21/235 |
| 2004/0194123 A1 | 9/2004 | Fredlund et al. | |
| 2007/0118848 A1 * | 5/2007 | Schwesinger | H04H 60/33 725/9 |
| 2008/0134043 A1 * | 6/2008 | Georgis | H04L 67/104 715/733 |
| 2008/0144107 A1 * | 6/2008 | Lieb | G06T 11/60 358/1.18 |
| 2009/0265742 A1 * | 10/2009 | Schwartz | H04N 7/17318 725/46 |

(Continued)

*Primary Examiner* — Brian T Pendleton
*Assistant Examiner* — Humam M Satti
(74) *Attorney, Agent, or Firm* — Ballard Spahr LLP

(57) ABSTRACT

Provided are methods and systems for displaying content. A plurality of preferred content items can be displayed on one or more display devices according to user preference and content attributes. In an aspect, an example method can comprise receiving preference information from a plurality of sources in a common location. A highest ranked preferred content item can be determined. At least one display parameter (e.g., size, shape, resolution, color, spatial coordinates, positions, etc.) for the highest ranked preferred content item can be determined. One or more of the plurality of content items including the preferred content item can be provided and displayed on the one or more display devices according to the determined at least one display parameter, for example, where the highest ranked preferred content item has the largest portion of the display.

20 Claims, 5 Drawing Sheets

(56) References Cited

U.S. PATENT DOCUMENTS

| | | | |
|---|---|---|---|
| 2009/0328105 A1* | 12/2009 | Craner | G06F 17/30997 725/46 |
| 2012/0042280 A1* | 2/2012 | Hoffman | H04L 67/306 715/800 |
| 2012/0117581 A1* | 5/2012 | Curtis | G06F 3/0484 725/9 |
| 2013/0046796 A1* | 2/2013 | Hossain | H04L 67/306 707/803 |
| 2013/0103556 A1 | 4/2013 | Lyon | |
| 2013/0174273 A1* | 7/2013 | Grab | G06F 21/10 726/28 |
| 2013/0195322 A1 | 8/2013 | Santhiveeran et al. | |
| 2013/0246522 A1* | 9/2013 | Bilinski | H04N 21/4825 709/204 |
| 2014/0068654 A1* | 3/2014 | Marlow | H04N 21/23418 725/28 |
| 2014/0089017 A1* | 3/2014 | Klappert | G06Q 10/02 705/5 |
| 2014/0172622 A1* | 6/2014 | Baronshin | G06Q 30/0631 705/26.7 |
| 2014/0223480 A1* | 8/2014 | Berry | H04N 21/4668 725/40 |
| 2014/0282744 A1* | 9/2014 | Hardy | H04N 21/482 725/61 |
| 2015/0121431 A1* | 4/2015 | Jacoby | H04N 21/251 725/59 |
| 2015/0149585 A1* | 5/2015 | Zhang | H04L 51/14 709/217 |
| 2016/0004777 A1* | 1/2016 | Granstrom | G06F 16/9535 707/728 |
| 2016/0088358 A1* | 3/2016 | Garcia Navarro | H04N 21/4826 725/46 |
| 2017/0213243 A1* | 7/2017 | Dollard | G06Q 30/0249 |

* cited by examiner

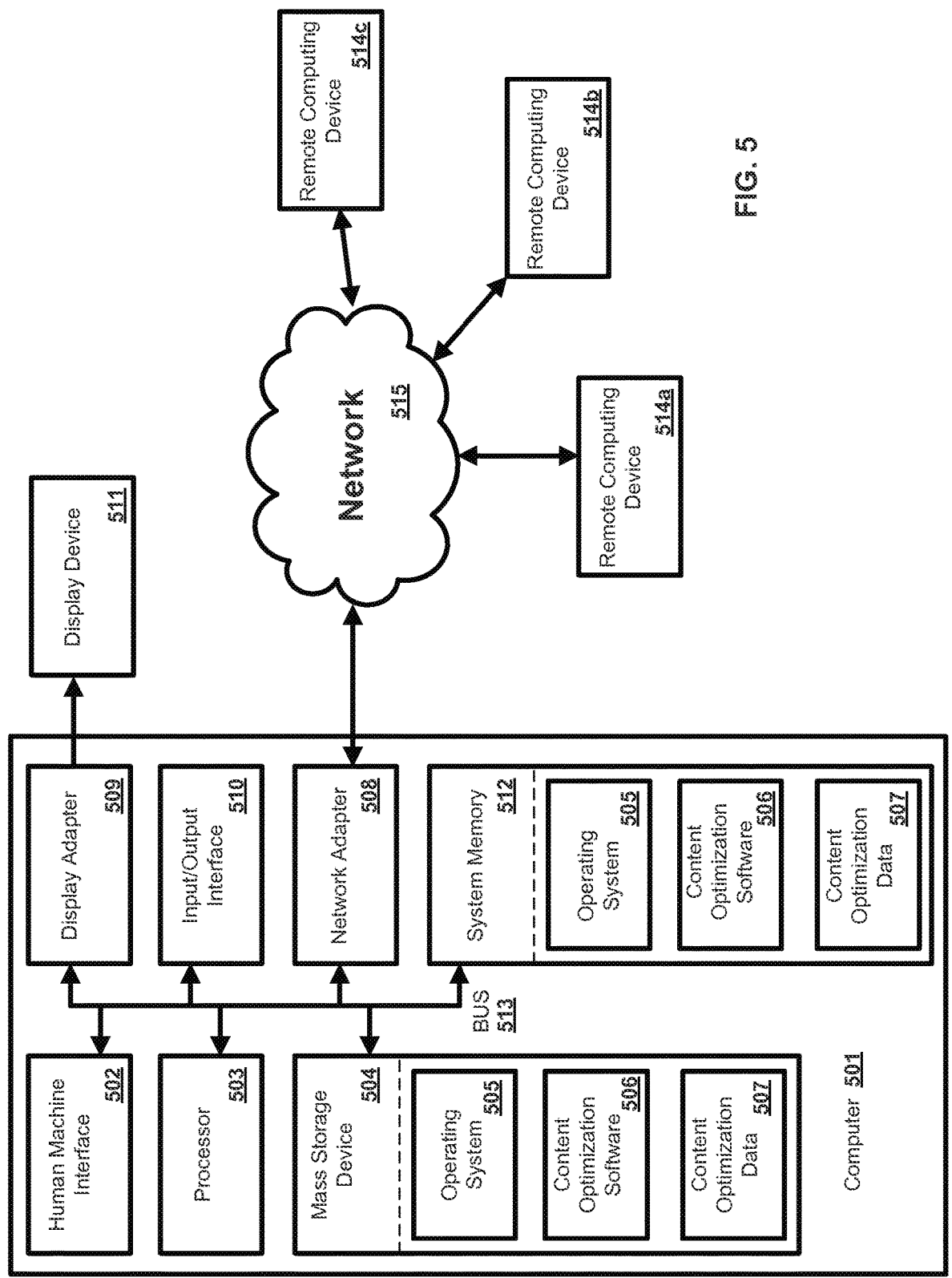

METHODS AND SYSTEMS FOR DISPLAYING CONTENT BASED ON PREFERENCE INFORMATION

BACKGROUND

It is possible to display a plurality of content items simultaneously on multiple regions of a display or screen. The plurality of content items displayed on multiple regions of a screen, however, are pre-selected and display parameters of the content items such as size and resolution are predefined. These and other shortcomings are addressed in the present disclosure.

SUMMARY

It is to be understood that both the following general description and the following detailed description are exemplary and explanatory only and are not restrictive, as claimed. Provided are methods and systems for displaying content. In one aspect, a plurality of content items can be displayed on one display device according to a user preference. In an aspect, preference information can be received from one or more of a plurality of sources (e.g., user devices, user inputs, or sensors). The preference information can relate to a plurality of preferred content items. The plurality of sources can be in and/or around a common location. A highest ranked preferred content item can be determined based on the preference information received from the one or more of the plurality of sources. At least one display parameter (e.g., size, shape, resolution, color, spatial coordinates, positions, etc.) for the highest ranked preferred content item can be determined. One or more of the plurality of preferred content items including the highest ranked preferred content item can be provided on one or more display devices, wherein the highest ranked preferred content item can be displayed according to the determined at least one display parameter. For example, the highest ranked preferred content item can be displayed at a most prominent position and/or in a largest portion on the screen of a display device.

In another aspect, a plurality of content items can be displayed on a plurality of display devices according to a user preference. As an example, preference information (e.g., preferred content items) can be received from one or more of a plurality of sources, such as a plurality of devices and/or users (e.g., user devices, sensors, user inputs, etc.). The plurality of devices can be in and/or around a common location. A highest ranked preferred content item can be determined based on preference information received from one or more of the plurality of sources (e.g., user devices, sensors, user inputs, etc. . . . ). At least one display parameter (e.g., number of display device) for the determined highest ranked preferred content item can be determined. One or more of the plurality of preferred content items can be provided on one or more of a plurality of display devices based on the determined at least one display parameter.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a block diagram illustrating an example computing device.

DETAILED DESCRIPTION

Figure 1:
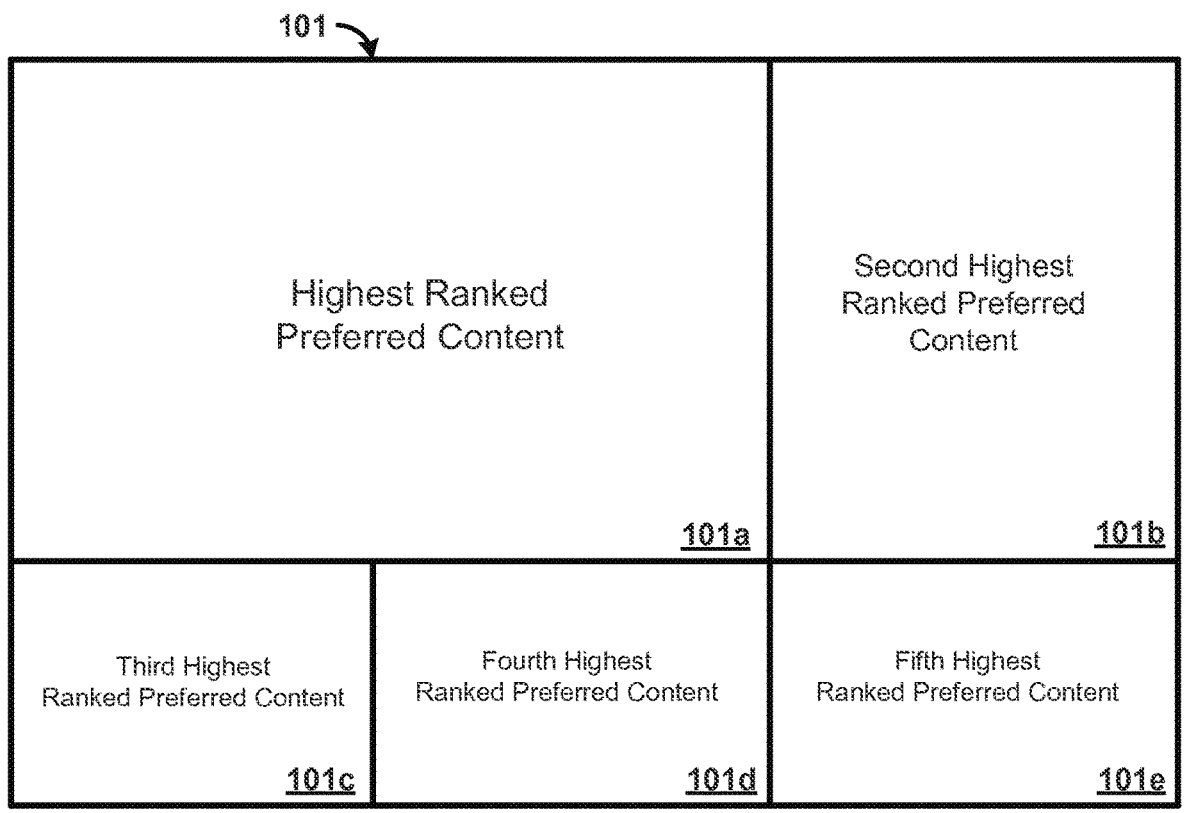
FIG. 1 illustrates an exemplary content display according to an aspect of the system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for displaying content. In an aspect, a plurality of content items can be displayed on one display device according to user preference. For example, user preference can comprise one or more preferred sporting teams, sports, news channels, topics, genres, a plurality of preferred content items, and the like. As an example, preference information (e.g., topics, genres, sports teams, preferred content items) can be received from a plurality of sources, such as a plurality of devices (e.g., user devices) and/or users. The plurality of sources can be in a common location. A highest ranked preferred content item can be determined. At least one display parameter (e.g., size, shape, resolution, color, spatial coordinates, positions, etc.) for the highest ranked preferred content item can be determined. The plurality of preferred content items can be provided on one display device, wherein the highest ranked preferred content item can be displayed according to the determined at least one display parameter.

The disclosed method and system relates to providing multiple content items (e.g., television programs) to one or more display devices. For example, when only one television is available in a restaurant, a highest ranked preferred content item (e.g., most popular content among the restaurant customers) of the multiple content items can be displayed with largest size or the highest resolution in the television. One or more non-highest ranked preferred content item (e.g., second popular content, third popular content) can be displayed in the remaining area of the television with smaller size and/or lower resolution. The ranking of the multiple content items can be determined by customers in the restaurant via their associated user devices (e.g., smartphones, PDAs, tablets, etc.). As another example, when multiple (e.g., five) televisions are available in a restaurant, the highest ranked preferred content item (e.g., most popular content) of the multiple content items can be displayed in more than half of the total number of television (e.g., three televisions) and/or one or more display devices with largest screen size, best display quality, best location (e.g., center of the restaurant), a combination thereof. One or more non-highest ranked preferred content item (e.g., second popular content, third popular content) can be displayed in remaining number of televisions. For example, one television can display a second popular content and one television can display a third popular content.

In an aspect, a plurality of content items can be displayed on one or more of a plurality of display devices according to a user preference. For example, the user preference can comprise one or more preferred sporting teams, sports, news channels, topics, genres, a plurality of preferred content items, and the like. As an example, preference information (e.g., topics, genres, preferred content items) can be received from one or more of a plurality of sources, such as a plurality of devices (e.g., user devices) and/or users. The plurality of sources can be in and/or around a common location. A highest ranked preferred content item can be determined based on preference information received from one or more of the plurality of user devices. At least one display parameter (e.g., size, color, resolution, number of display device) for the determined highest ranked preferred content item can be determined. The plurality of preferred content items can be provided on a plurality of display devices based on the determined at least one display parameter. The disclosed methods and systems can serve for many applications such as video entertainment in a public place, wherein multiple video programs can be displayed in one or a limited number of display devices.

FIG. 1 illustrates an exemplary content display according to an aspect of the system. In an aspect, a plurality of (e.g., two, three, four, five, etc. . . . ) content items 101a, 101b, 101c, 101d and 101e can be displayed on a display device 101. The plurality of content items can be displayed according to a rank order. The plurality of content items can comprise the highest ranked preferred content item 101a, the second highest ranked preferred content item 101b, the third highest ranked preferred content item 101c, the fourth highest ranked preferred content item 101d, and the fifth highest ranked preferred content item 101e. In an aspect, the highest ranked preferred content item can be a content item, a type of content item, a topic, a channel, and the like, preferred by the highest number of viewers located around the displayed device 101. In an aspect, one or more of the plurality of content items can be a sponsored content item that can be displayed regardless of rank or preference. In an aspect, the highest ranked preferred content item 101a can be displayed with one or more predefined display parameters. As an example, the one or more predefined display parameters can comprise size, shape, resolution, color, spatial coordinates, direction, position, and the like. As shown in FIG. 1, the highest ranked preferred content item 101a can be displayed at a specific position (e.g., upper left corner) of the display device 101 such that the display of the highest ranked preferred content item 101a is more prominent relative to other content items (e.g., largest size, easiest viewed position, etc. . . . ). The second highest ranked preferred content item 101b can be displayed at another specific position (e.g., upper right corner) of the display device 101, such that the display of the second highest ranked preferred content item 101a is less prominent than the highest ranked preferred content item 101a (e.g., second largest size, etc.), but more prominent relative to other content items. The third highest ranked preferred content item 101c, the fourth highest ranked preferred content item 101d, and the fifth highest ranked preferred content item 101e can be equal-sized and displayed at the bottom portion of the display device 101. In an aspect, the highest ranked preferred content item 101a can be displayed at a higher resolution (e.g., 4K), and the non-highest ranked preferred content items (e.g., 101b, 101c, 101d, 101e) can be displayed at a lower resolution (e.g., 2K). In another aspect, the highest ranked preferred content item 101a can be displayed with color, and the non-highest ranked preferred content items (e.g., 101b, 101c, 101d, 101e) can be displayed with black and white. In an aspect, any combination of parameter can be used with any of the content items. For example, the highest ranked preferred content item can be displayed with the highest resolution and the largest size. The non-highest ranked preferred content item can be displayed with a smaller size and a lower resolution. As another example, the displayed content items can be in the same resolution, but only the highest ranked preferred content item is displayed with color.

In an aspect, a plurality of display modes can be used. Each display mode can comprise information such as a number of content items (e.g., 3, 4, 5, etc.) to be displayed and one or more display parameters (e.g., size, position, resolution, color, shape, etc.) associated with each content item. When a specific display mode is selected, at least one display parameter for the plurality of preferred content items can be updated accordingly. In an aspect, placement of one or more content items can be changed. For example, the highest ranked preferred content item 101a can be relocated from the upper left corner to the center or upper right corner of the display device 101 when a specific display mode is selected. In another aspect, size of one or more content items can be changed. For example, the size of the highest ranked preferred content item 101a can be changed from half of the screen of the display device 101 to one third of the screen when a specific display mode is selected. A display mode can be selected and/or activated any time during presentation of a plurality of preferred content items.

Figure 2:
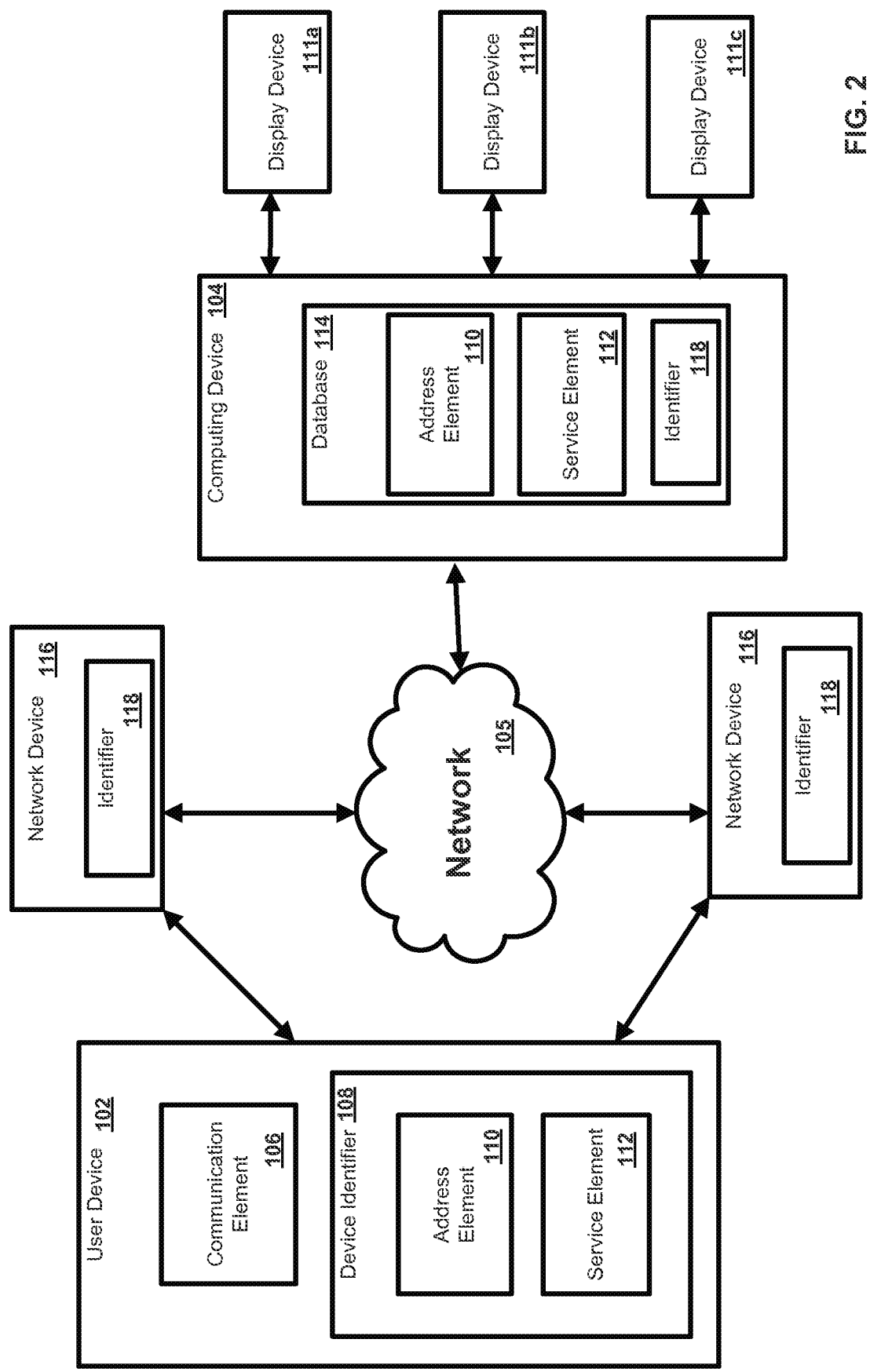
FIG. 2 illustrates various aspects of an exemplary system in which the present methods and systems can operate.

In one aspect of the disclosure, a system can be configured to provide services such as network-related services to a user device. FIG. 2 illustrates various aspects of an exemplary environment in which the present methods and systems can operate. For example, a user device 102 can comprise a computer, tablet, mobile device, communications terminal, a sensor to receive user information (e.g., user biometric data, user eye tracking data, user face recognition data, etc.) or the like. In an aspect, one or more network devices (e.g., computing device 104, network device 116) can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104. In an aspect, the computing device 104 can be a content display management server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the computing device 104 can be associated with one or more display devices, for example, display devices 111a. 111b and 111c. In an aspect, the computing device 104 and one or more of the display devices (e.g., display device 111a, 111b, 111c) can be implemented as separate network entities or reside in a common location. In the latter case, the communication in the common location can be performed by way of internal functionality.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data (e.g., preference information) to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108. In an aspect, device identifier 108 can be transmitted when preference information is transmitted from the user device 102 to the computing device 104.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network. In an aspect, address element 110 can be transmitted when preference information is transmitted from the user device 102 to the computing device 104.

In an aspect, the service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, customer status, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. As an example, the service element 112 can comprise a preferred sporting event, a preferred news channel, a preferred music channel, and/or the like. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112. For example, service element 112 can be associated with user profiles, user preferences, user viewing history, and the like.

In an aspect, the computing device 104 can be a server for communicating with the user device 102. As an example, the computing device 104 can be configured to receive viewer preference information from a plurality of sources such as the user device 102. In an aspect, the computing device 104 can interact with remote resources such as data, devices, content providers, and files. As an example, the computing device 104 can be configured as (or disposed at) a central location (e.g., a headend, or processing facility), which can receive content (e.g., data, input programming) from multiple sources. As an example, the multiple resources can comprise cable content providers, digital video disk (DVD) players, camcorders, satellite receivers, cameras, digital video recorders (DVRs) and/or the like. In an aspect, the computing device 104 can combine the content from the multiple sources and can distribute the content to one or more display devices (e.g., display device 111a, 111b, 111c) via a distribution system.

In an aspect, the computing device 104 can manage the communication between the user device 102 and a database 114 for sending and receiving data therebetween. As an example, the database 114 can store a plurality of files (e.g., preferred customer identification, customer identifiers or records, or other information. As an example, the database 114 can store display mode, display parameters, the like. In an aspect, the database 114 can store information relating to the user device 102 such as the address element 110 and/or the service element 112. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the computing device 104 can be associated with a plurality of user devices (e.g., user device 102). In an aspect, the computing device 104 can receive preference information from a plurality of sources (e.g., user devices, sensors, user data collector) located in a common location (e.g., a restaurant, a bar, a conference). The preference information can comprise information indicative of user preferences. For example, the preference information can comprise one or more preferred sporting teams, sports, news channels, topics, genres, a plurality of preferred content items, and the like. The computing device 104 can be configured to determine a highest ranked preferred content item and at least one display parameter for the highest ranked preferred content item based on preference information received from one or more of the plurality of user devices. Accordingly, a plurality of preferred content items can be provided to one or more display devices in the common location, wherein the highest ranked preferred content item can be displayed according to the determined at least one display parameter.

In an aspect, the computing device 104 and/or the network device 116) can maintain registration information (e.g., login information) associated with a registered user or user device. For example, the registration information (e.g., user preference, user profile, etc.) can be stored in database 114. Accordingly, a user or a user device can be automatically registered when the user or user device is present a second time. In an aspect, a user can be prompted upon being within a range of a system (e.g., within a predefined distance to the computing device 104). For example, a user can receive a prompt for a preference input or receive a request for inquiry on whether to count his user preference information. As another example, a user can receive a prompt to select a location if the user is within range of multiple location choices.

In an aspect, the computing device 104 can access multiple tuners and/or devices to receive the plurality of preferred content items (e.g., channels, television programs, movies, etc.). As an example, the plurality of preferred content items can be received from cable content providers, digital video disk (DVD) players, camcorders, satellite receivers, cameras, digital video recorders (DVRs), and/or the like. In one aspect, the computing device 104 can utilize a picture-in-picture (PIP) technique to provide the plurality of preferred content items in one content stream to a display device. As an example, attributes (e.g., size, location, color, resolution, number of regions) of a PIP image can be determined based on the at least one display parameter. In another aspect, the computing device 104 can remux the plurality of preferred content items and transmit the plurality of preferred content items to a display device. In an aspect, the computing device 104 can provide the plurality of preferred highest ranked preferred content items to a plurality of display devices according to network address (e.g., address element 110) and/or device identifiers (e.g., device identifier 108) associated with respective plurality of display devices. For example, the computing device 104 can transmit the highest ranked preferred content item to one or more display devices with largest screen and/or highest display quality. In an aspect, the plurality of preferred content items can be synchronized such that all live video channels and/or programs are displayed simultaneously in real time.

Figure 3:
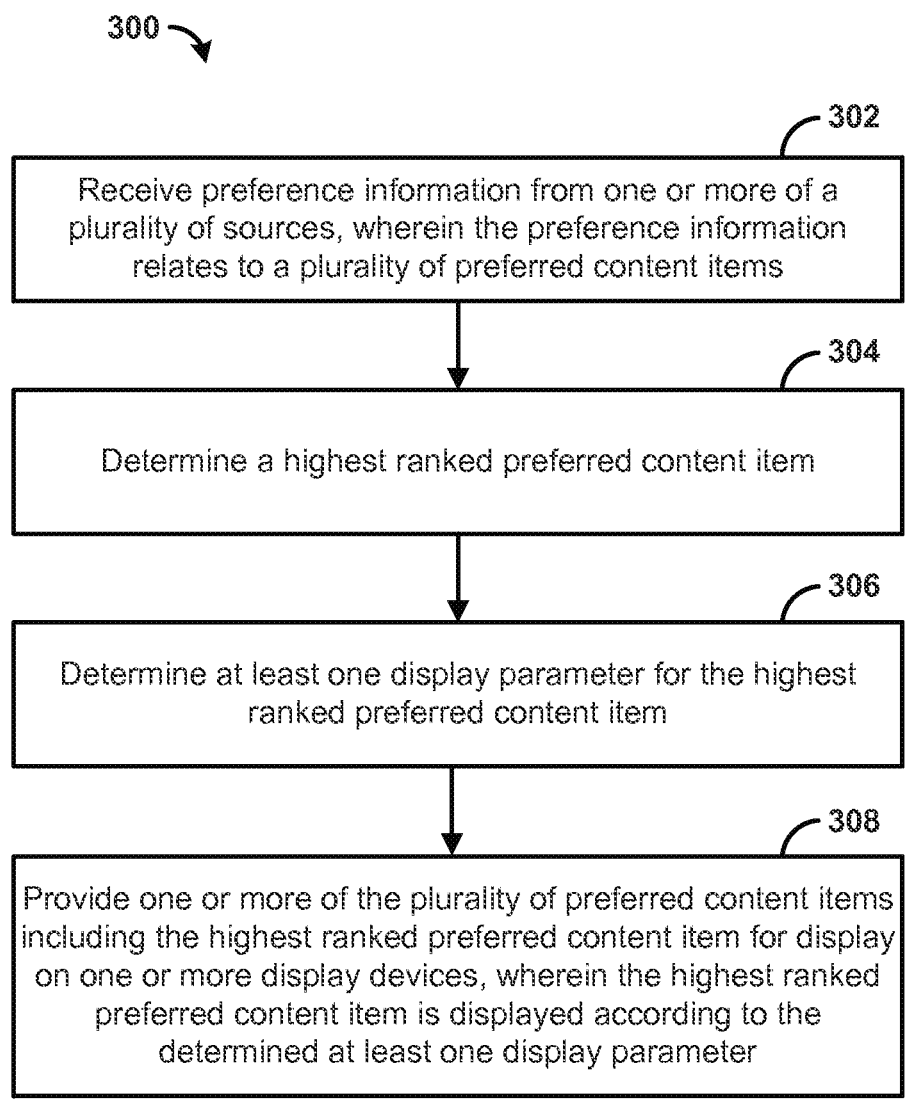
FIG. 3 is a flowchart illustrating an example method for displaying content.

FIG. 3 is a flowchart illustrating an example method for displaying content. At step 302, preference information can be received from a plurality of sources. For example, the plurality of sources can comprise a plurality of devices (e.g., user devices), user inputs, sensors, and the like, configured to receive data such as biometric data, user eye tracking data, user gesture data, and the like. As an example, the plurality of devices can comprise user devices such as smartphones, tablets, laptops, PDAs, computers, and/or the like. As another example, the user inputs can comprise input for user biometrics (e.g., finger print, hand geometry), gestures, and the like. As another example, the sensors can comprise motion sensors, eye tracking sensors, optical sensors, and the like. The plurality of sources can be in a common location such as a restaurant, a bar, a conference, and the like. The plurality of devices can each be associated with one of a plurality of users (e.g., customers in the restaurant or a bar). In an aspect, the preference information can comprise one or more preferred sporting teams, sports, news channels, topics, genres, a plurality of preferred content items, and the like. As an example, the content items can comprise television programs, movies, channels, sport events, and the like.

In an aspect, the preference information can be received when the plurality devices register with (e.g., log into) a network device (e.g., network device 116) associated with the common location (e.g., restaurant). Accordingly, a computing device (e.g., computing device 104) connected to the network device (e.g., network device 116) can receive preference information via accessing user information associated with the plurality of registered devices. In an aspect, the system (e.g., computing device 104, network device 116) can maintain registration information (e.g., login information) associated with a registered user or user device. For example, the registration information (e.g., user preference, user profile, etc.) can be stored in database 114. Accordingly, a user or a user device can be automatically registered when the user or user device is present a second time. In an aspect, a user can be prompted upon being within a range of a system (e.g., within a predefined distance to the computing device 104). For example, a user can receive a prompt for a preference input or receive a request for inquiry on whether to count his user preference information. As another example, a user can receive a prompt to select a location if the user is within range of multiple location choices.

In an aspect, the user information can comprise customer status information, subscription information, user demographic information, viewing history, user interests (e.g., hobbies, favorite teams, political views), and/or the like. In an aspect, user information can comprise preference information or a portion of preference information. As an example, the preference information can indicate a specific user (e.g., viewer, customer) prefers to watch a football game. As another example, the preference information can indicate a specific user (e.g., viewer, customer) prefers to watch a particular news channel.

In an aspect, the preference information can be received via facial recognition. For example, a camera can determine the presence of a user by his facial features. The facial features of a user can be transmitted to a database to identify the respective user. User information of the identified user can be retrieved accordingly.

In another aspect, the preference information can be received when a plurality of users (e.g., viewers, customers) make their preference selections based on a plurality of available content items and/or user information. For example, each of the plurality of devices can be provided with a menu indicating a plurality of available content items. The menu can be in the form of popup dialog, overlay, email, text, or the like. As an example, the plurality of available content items can comprise a football game involving a particular team, a baseball game involving a particular team, a specific news channel, a specific movie, and/or the like. A user can make a selection on the menu via multi-touch gestures, mouse clicks and other type of command appropriate for the device associated with the user. For example, a multi-touch gesture can be used for a smartphone or a tablet, and a multi-touch trackpad can be used on a desktop computer. Preference information can be received when the plurality of users (e.g., viewers, customers) provide their preference selections on the menu.

At step 304, a highest ranked preferred content item can be determined. In an aspect, the highest ranked preferred content item can be determined via a computing device (e.g., computing device 104). As an example, the highest ranked preferred content item can be determined via determining the number of users associated with each of the plurality of available content items. The content items associated with the highest number of users (e.g., viewers, customers) can be determined as the highest ranked preferred content item. For example, it can be determined from user information associated with the plurality devices that highest number of users indicates football as their hobbies. Accordingly, an available football game can be determined as the highest ranked preferred content item. As another example, it can be determined from menu selections that highest number of users prefers to watch a particular movie. Accordingly, the particular movie can be determined as the highest ranked preferred content item.

In an aspect, content items can be ranked based on location of users and/or user devices in a common location. For example, even though most users in a common location prefer a first content item, most users located in a specific section of the common location can prefer a second content item. In this scenario, the disclosed methods can be implemented in the specific section of the common location. By way of example, the highest ranked preferred content item in the specific location (e.g., the second content item) can be displayed in the most prominent size, location, resolution, and the like, in the specific section of the common location.

In an aspect, determining a highest ranked preferred content item can comprise determining a plurality of weight factors. As an example, determining the plurality of weight factors can comprise determining a customer status associated with the respective plurality of devices. A user (e.g., customer) with higher customer status (e.g., preferred customer) can be assigned a higher weight on his preference selection or user information than a user with lower customer status. In an aspect, determining the plurality of weight factors can comprise determining loyalty points, reward points, amount of payments, and the like, associated the respective plurality of devices. As an example, a user that uses more reward points can be assigned a higher weight on his preference selection than a user with fewer reward points. In another aspect, determining the plurality of weight factors can comprise participating in a mini-game, a bidding process, and the like. For example, a winner of a mini-game can be assigned the highest weight factor.

In an aspect, determining the plurality of weight factors can comprise determining one or more content attributes of the plurality of preferred content items. For example, a content attribute can comprise a content type (e.g., game, movie, TV series, etc.) and/or a content status (e.g., tied game, non-tied game, last episode, preferred team). Content type can be any category that content may fall into. Content status can be any feature of content that can be used to distinguish one content item from another and, in some aspects, regardless of content type. For example, a game can be assigned a higher weight factor than a non-game. As another example, a tied game can be assigned a higher weight factor than a non-tied game. As an example, determining the plurality of weight factors can comprise determining whether a preferred content item is a game, and whether the score of the game is tied. A tied game can be assigned a higher weight than a non-tied game. As another example, determining the plurality of weight factors can comprise determining whether a preferred content item is a game, and whether the game is within a predefined time (e.g., five minutes) to an end. The game that is within a predefined time to an end can be assigned a higher weight than a game that is not within a predefined time to an end. As an example, determining the plurality of weight factors can comprise determining nature of content items. For example, if a content item related to a critical event such as breaking international or national news, server weather conditions, crimes happening near the location of the display device, and/or the like, the content item can be assigned a higher weight.

In an aspect, the highest ranked preferred content item can be determined at a specific frequency. For example, the highest ranked preferred content item can be determined every five minutes. In an aspect, a computing device (e.g., the computing device 104) can receive (e.g., collect, inquire) preference information from a plurality of devices at a specific frequency. As an example, preference information can change when one or more user (e.g., viewer, customer) changes his mind on his preferred content item. As another example, preference information can change when users change in a specific period of time. For example, multiple customers can enter or leave the common location (e.g., the restaurant) over time.

At step 306, at least one display parameter for the highest ranked preferred content item can be determined. As an example, the at least one display parameter can comprise one or more of: size, shape, resolution, color, spatial coordinates, directions, positions, and the like. For example, the highest ranked preferred content item can have largest size and/or the most prominent location on the screen of a display device that displays several items of content. The largest size can be predefined (e.g., predefined coordinates). As another example, the highest ranked preferred content item can have highest resolution (e.g., 4K resolution). As another example, the highest ranked preferred content item can be displayed on a specific position (e.g., center, upper left corner, etc.) of the display device such that the display of the highest ranked preferred content item is more prominent relative to other content items. As another example, the highest ranked preferred content item can be displayed on a specific direction and position relative to a specific point of the display device. As another example, the highest ranked preferred content item can be displayed with color. As another example, the highest ranked preferred content items can be displayed on one or more display devices with best display quality. As another example, the highest ranked preferred content items can be displayed on one or more display devices with best location.

In an aspect, at least one display parameter of non-highest ranked preferred content items can be determined. For example, the non-highest ranked preferred content item can be displayed in black and white. As another example, a plurality of non-highest ranked (e.g., second highest ranked, third-highest ranked, fourth-highest ranked) preferred content items can be equal-sized on the remaining screen of the display device. As another example, when the highest ranked preferred content item is displayed at the center of the display device, the non-highest ranked preferred content can be display at four corners of the display device. In an aspect, the highest ranked preferred content item can be displayed in the highest number of display devices (e.g., more than half of total available display devices). In another aspect, the highest ranked preferred content item can be displayed in one or more display devices with largest screen size. In another aspect, the highest ranked preferred content item can be displayed in one or more display devices with highest display quality.

In an aspect, a plurality of display modes can be predefined and stored. Each display mode can be associated with number of content items (e.g., 3, 4, 5, etc.) for display and associated one or more display parameters (e.g., size, position, resolution, number of display devices associated with each content item). As an example, at least one display parameter can be updated when a specific display mode is selected. In an aspect, placement of one or more content items can be changed. For example, the highest ranked preferred content item can be relocated from the upper left corner to the center or upper right corner of the display device 101 when a specific display mode is selected. In another aspect, size of one or more content items can be changed. For example, the size of the highest ranked preferred content item can be changed from half of the screen of a display device to one third of the screen when a specific display mode is selected. A specific display mode can be selected and/or activated any time during presentation of a plurality of content items.

At step 308, one or more of the plurality of preferred content items can be provided on one or more display devices, and the highest ranked preferred content item can be displayed according to the determined at least one display parameter. For example, the top five out of the seven most preferred content items can be provided. As an example, the highest ranked preferred content item can be displayed in largest size with color and highest resolution. The non-highest ranked preferred content item can be displayed in black and white and a lower resolution. As another example, the highest ranked preferred content item can be displayed in one or more display devices with largest screen size and/or one or more display devices with highest display quality. The one or more non-highest ranked preferred content items (e.g., three) can be displayed on one or more display device with smaller screen and/or loser resolution. In an aspect, a computing device (e.g., the computing device 104) can access multiple tuners and/or devices to receive the plurality of preferred content items (e.g., channels, television programs, movies, etc.). As an example, the one or more of the plurality of preferred content items can be received from cable content providers, digital video disk (DVD) players, camcorders, satellite receivers, cameras, digital video recorders (DVRs) and/or the like. In an aspect, a computing device (e.g., computing device 104) can utilize picture-in-picture (PIP) technique to provide the plurality of preferred content items in one content stream to the display device. In another aspect, a computing device (e.g., the computing device 104) can remux the plurality of preferred content items and transmit the plurality of preferred content items to the display device. In an aspect, the one or more of the plurality of preferred content items can be synchronized such that all live video channels and/or programs are displayed simultaneously in real time.

As an example, five content items can be provided and displayed on the display device 101, as shown in FIG. 1. Five content items can comprise the highest ranked preferred content item 101a, the second highest ranked preferred content item 101b, the third highest ranked preferred content item 101c, the fourth highest ranked preferred content item 101d, and the fifth highest ranked preferred content item 101e. In an aspect, the highest ranked preferred content item 101a can be displayed according to at least one predefined display parameter. As an example, the at least one predefined display parameter can comprise size, shape, resolution, color, spatial coordinates, directions, positions, and the like. As shown in FIG. 1, five preferred content items can be provided on the display device. The highest ranked preferred content item 101a can be displayed at a specific position (e.g., upper left corner) of the display device 101 such that the display of the highest ranked preferred content item 101a is more prominent relative to other content items (e.g., largest size, easiest viewed position, etc.). The second highest ranked preferred content item 101b can be displayed at another specific position (e.g., upper right corner) of the display device 101, such that the display of the second highest ranked preferred content item 101a is less prominent than the highest ranked preferred content item 101a (e.g., second largest size, etc. . . . ), but more prominent relative to other content items. The third highest ranked preferred content item 101c, the fourth highest ranked preferred content item 101d, and the fifth highest ranked preferred content item 101e can be displayed at equal size of the bottom portion of the display device 101. As another example, the highest ranked preferred content item 101 can be displayed at a higher resolution (e.g., 4K), and the non-highest ranked preferred content items (e.g., 101b, 101c, 101d, 101e) can be displayed at a lower resolution (e.g., 2K). As another example, the highest ranked preferred content item 101a can be displayed with color, and the non-highest ranked preferred content items (e.g., 101b, 101c, 101d, 101e) can be displayed with black and white. As another example, the highest ranked preferred content item can be displayed in the highest number of display devices (e.g., more than half of total available display devices). As another example, the highest ranked preferred content item can be displayed in one or more display devices with largest screen size. As another example, the highest ranked preferred content item can be displayed in one or more display devices with highest display quality.

Figure 4:
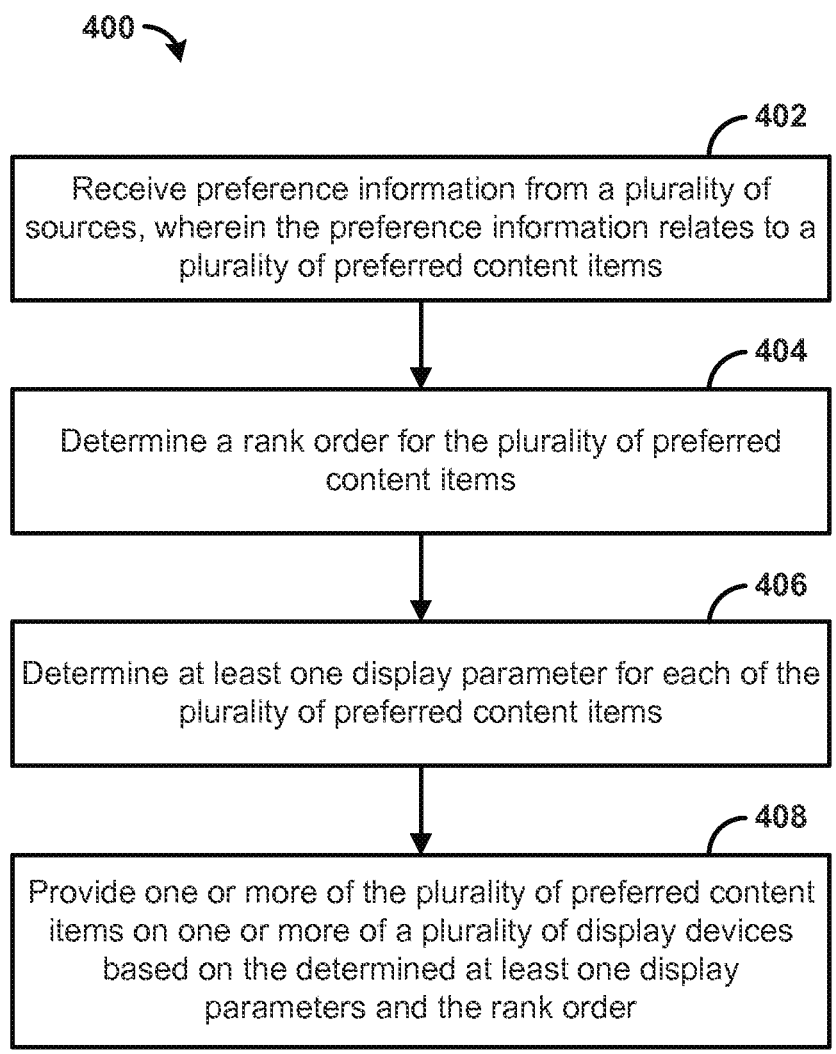
FIG. 4 is a flowchart illustrating another example method for displaying content.

FIG. 4 is a flowchart illustrating another example method for displaying content. At step 402, preference information can be received from a plurality of sources. For example, the plurality of sources can comprise devices (e.g., user devices), user inputs, sensors and the like, configured to receive data such as biometric data, data associated user eye tracking, user gesture data, and the like. As an example, the devices can comprise user devices such as smartphones, tablets, laptops, PDAs, computers, and/or the like. As another example, the user inputs can comprise input for user biometrics (e.g., finger print, hand geometry) and/or user gestures. As another example, the sensors can comprise motion sensors, eye tracker, optical sensor, and the like. The plurality of devices can be in a common location such as a restaurant or a bar. The plurality of devices can be associated with a plurality of users (e.g., customers in the restaurant). In an aspect, the preference information can comprise a plurality of preferred content items. As an example, the content items can comprise television programs, movies, sport events, channels, and the like.

In an aspect, the preference information can be received when the plurality of devices register (e.g., log into) with a network device (e.g., network device 116) in the common location (e.g., restaurant). A computing device (e.g., computing device 104) connected to the network device (e.g., network device 116) can receive preference information via accessing user information associated with the plurality of devices. In an aspect, the user information can comprise customer status information, subscription information, user demographic information, viewing history, user interests (e.g., hobbies, favorite teams, political views), and/or the like. As an example, the preference information can indicate a specific user (e.g., viewer, customer) prefers to watch a football game. As another example, the preference information can indicate a specific user (e.g., viewer, customer) prefers to watch a particular news channel.

In another aspect, the preference information can be received when a plurality of users (e.g., viewers, customers) make preference selections based on a plurality of available content items. For example, each of the plurality of devices can be provided with a menu indicating a plurality of available content items. As an example, the menu can be in the form of popup dialog, overlay, email, text, or the like. As an example, the plurality of available content items can comprise a football game involving a particular team, a baseball game involving a particular team, a specific news channel, a specific movie, and the like. A user can make a selection on the menu via multi-touch gestures, mouse clicks and other type of command appropriate for the device in use. For example, a multi-touch gesture can be used for a smartphone or tablet, and a multi-touch trackpad can be used on a desktop computer. Preference information can be received when the plurality of users provided their menu selections.

In an aspect, registration information (e.g., login information) associated with a registered user or user device can be maintained, for example, by the computing device 104, the network device 116. For example, the registration information (e.g., user preference, user profile, etc.) can be stored in database 114. Accordingly, a user or a user device can be automatically registered when the user or user device is present a second time. In an aspect, a user can be prompted upon being within a range of a system (e.g., within a predefined distance to the computing device 104). For example, a user can receive a prompt for a preference input or receive a request for inquiry on whether to count his user preference information. As another example, a user can receive a prompt to select a location if the user is within range of multiple location choices.

At step 404, a rank order can be determined for the plurality of preferred content items. In an aspect, the rank order can be based on the preference information. For example, each content item of the plurality of preferred content items can be assigned a number in order of preference (e.g., 1 is the highest ranked preferred content item, 2 is the next highest ranked preferred content item, and so on). The rank order can be determined via a computing device (e.g., computing device 104). As an example, the rank order can be determined via determining the number of users associated with each of the plurality of preferred content items. The content item associated with the highest number of users (e.g., viewers, customers) can be determined as the highest ranked preferred content item. For example, it can be determined from user information associated with the plurality devices that the highest number of users indicates football as their hobby. Accordingly, an available football game can be determined as the highest ranked preferred content item. As another example, it can be determined from menu selections that the highest number of users prefers to watch a particular movie. Accordingly, the particular movie can be determined as the highest ranked preferred content item.

In an aspect, determining a rank order can comprise determining a plurality of weight factors. As an example, determining the plurality of weight factors can comprise determining a customer status associated with the respective plurality of devices. A user with higher customer status (e.g., preferred customer) can be assigned a higher weight on his menu choice or user information than a user with lower customer status. As a further example, determining the plurality of weight factors can comprise determining whether a content item is a game, and whether a score of the game is tied. A tied game can be assigned a higher weight than a non-tied game. As another example, determining the plurality of weight factors can comprise determining whether a content item is a game, and whether the game is within a predefined time (e.g., five minutes) to an end. The game that is within a predefined time to an end can be assigned a higher weight than a game that is not within a predefined time to an end. As an example, determining the plurality of weight factors can comprise determining a nature of content items. For example, if a content item related to a critical event such as breaking international or national news, severe weather conditions, crimes happening near the location of the display device 101, and/or the like, the content item can be assigned a higher weight.

In an aspect, the rank order can be determined at a specific time period. For example, the rank order can be determined every five minutes. In an aspect, the computing device can receive (e.g., collect, inquire) preference information from a plurality of devices at a specific time period. As an example, preference information can change when one or more user (e.g., viewer, customer) changes his mind on preferred content items. As another example, preference information can change when users change during a specific period of time. For example, multiple customers entering or leaving a restaurant during the specific period of time.

At step 406, at least one display parameter for the plurality of preferred content items can be determined. As an example, a display parameter can comprise one or more of: resolution, color, number of display devices, and the like. For example, the highest ranked preferred content item can be displayed on more than half of available plurality of display devices. As another example, the highest ranked preferred content item can have highest resolution (e.g., 4K). As another example, the highest ranked preferred content item can be displayed with color. As another example, the highest ranked preferred content item can be transmitted to one or more of largest display devices. As another example, the highest ranked preferred content item can be transmitted to one or more display devices with the best location (e.g., center of a restaurant). The display parameters for the remaining content items can be determined in a similar fashion with each content item assigned display parameters according to the rank order. The purpose being to prominently display the highest ranked preferred content item prominently and the remaining content items in reduced prominence according to the rank order. As an example, one or more of non-highest ranked preferred content items can be displayed on one display device of the remaining available display devices with a predefined resolution (e.g., 2K). As another example, the non-highest ranked preferred content items can be displayed with black and white.

In an aspect at least one plurality of display parameter can be updated. For example, when the highest ranked preferred content item is preferred by majority (e.g., 80%) of users (e.g., viewers, customers), the highest ranked preferred content item can be displayed on more than eighty percent of available display devices. In an aspect, the remaining display devices can be used to display one or more non-highest ranked preferred content items. For example, the plurality of non-highest ranked preferred content items can be displayed on one remaining display device with predefined sizes and resolution.

In an aspect, a plurality of display modes can be used. Each display mode can be associated with one or more display parameters (e.g., size, position, resolution, number of display devices) associated with each content item. A specific display mode can be selected and/or activated any time during presentation of a plurality of content items.

At step 408, one or more of the plurality of preferred content items can be provided on a plurality of display devices, or a single display device, based on the determined at least one display parameter and the rank order. For example, the top five out of the seven most preferred content items can be provided. In an aspect, a computing device (e.g., the computing device 104) can access multiple tuners and/or devices to receive the plurality of preferred content items (e.g., channels, television programs, movies, etc.). As an example, the one or more of the plurality of preferred content items can be received from cable content providers, digital video disk (DVD) players, camcorders, satellite receivers, cameras, digital video recorders (DVRs) and/or the like. In an aspect, the one or more of the plurality of preferred content items can be synchronized such that all live video channels and/or programs are displayed simultaneously in real time. In an aspect, in the event a display parameter has been determined for each of the plurality of content items, the display parameters can be used to arrange the various content items of the plurality of preferred content items according to the determined display parameters. For example, the top three preferred content items can be provided in prominent positions of decreasing prominence, and the like.

In an exemplary scenario, five content items can be provided on a plurality of display devices (e.g., nine display devices), or a single display device displaying multiple content items. The highest ranked preferred content item can be displayed on more than half (e.g., five) of the plurality of display devices, each of the plurality of non-highest ranked (e.g., second highest ranked, third-highest ranked, fourth-highest ranked) preferred content item can be displayed on remaining four display devices, each display device can be used to display one content item. In an aspect, the highest ranked preferred content item can be displayed with one or more predefined display parameters. As another example, the highest ranked preferred content item can be displayed on a higher resolution (e.g., 4K), and the non-highest ranked preferred content items can be displayed on a lower resolution (e.g., 2K).

In an exemplary aspect, the methods and systems can be implemented on a computer 501 as illustrated in FIG. 5 and described below. By way of example, user device 102, computing device 104 of FIG. 2 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, content display software 506, content data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as content data 507 and/or program modules such as operating system 505 and content display software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and content display software 506. Each of the operating system 505 and content display software 506 (or some combination thereof) can comprise elements of the programming and the content display software 506. Content data 507 can also be stored on the mass storage device 504. Content data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of content display software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining, by a computing device, and via one or more user devices of a plurality of user devices, user preference information associated with at least one preferred content item of a plurality of content items, wherein the plurality of user devices are in a common location;
    determining, based on respective user preference information corresponding to each user device of the plurality of user devices at a first time, a highest ranked preferred content item of the plurality of content items and a second highest ranked preferred content item of the plurality of content items;

causing output of the highest ranked preferred content item and the second highest ranked preferred content item, wherein the highest ranked preferred content item is output to a quantity of output devices, and wherein the quantity of output devices is determined based on the user preference information;

determining, by the computing device, at a second time later than the first time, and based on a change in the plurality of user devices at the common location, a new quantity of output devices;

causing output of at least one of: the highest ranked preferred content item or the second highest ranked preferred content item to the new quantity of output devices.

2. The method of claim 1, wherein causing output of at least one of: the highest ranked preferred content item or the second highest ranked preferred content item comprises causing output of at least one of: the highest ranked preferred content item or the second highest ranked preferred content item based on at least one output parameter, wherein the at least one output parameter comprises at least one of: size, shape, resolution, color, spatial coordinates, direction, or position.

3. The method of claim 1, wherein causing output of at least one of: the highest ranked preferred content item or the second highest ranked preferred content item comprises causing output of at least one of: the highest ranked preferred content item or the second highest ranked preferred content item based on at least one output parameter, wherein the at least one output parameter comprises an instruction indicating that the highest ranked preferred content item is configured to be output at a larger size than the second highest ranked preferred content item.

4. The method of claim 1, wherein causing output of at least one of: the highest ranked preferred content item or the second highest ranked preferred content item comprises causing output of at least one of: the highest ranked preferred content item or the second highest ranked preferred content item based on at least one output parameter, wherein the at least one output parameter comprises an instruction indicating that the highest ranked preferred content item is configured to be output at a higher resolution than the second highest ranked preferred content item.

5. The method of claim 1, wherein causing output of at least one of: the highest ranked preferred content item the second highest ranked preferred content item comprises causing output of at least one of: the highest ranked preferred content item or the second highest ranked preferred content item based on at least one output parameter, wherein the at least one output parameter comprises an instruction indicating that the highest ranked preferred content item is configured to be output at a specific location.

6. The method of claim 5, wherein the specific location is a center of one or more output devices of the quantity of output devices.

7. The method of claim 1, wherein causing output of at least one of: the highest ranked preferred content item or the second highest ranked preferred content item comprises causing output of at least one of: the highest ranked preferred content item or the second highest ranked preferred content item based on at least one output parameter, wherein the at least one output parameter comprises an instruction indicating that the highest ranked preferred content item is configured to be output in a first color scheme, and the second highest ranked preferred content item is configured to be output in a second color scheme.

8. The method of claim 1, wherein determining the highest ranked preferred content item and the second highest ranked preferred content item comprises determining a plurality of weight factors.

9. The method of claim 8, wherein determining the plurality of weight factors comprises determining a respective user status associated with each user device of the plurality of user devices.

10. The method of claim 8, wherein determining the plurality of weight factors comprises determining one or more content attributes of the plurality of content items.

11. The method of claim 10, wherein determining the highest ranked preferred content item and the second highest ranked preferred content item is further based on a content type and a content status of each content item of the plurality of content items.

12. The method of claim 1, wherein determining the highest ranked preferred content item of the plurality of content items and the second highest ranked preferred content item of the plurality of content items comprises determining the highest ranked preferred content item and the second highest ranked preferred content item at a time period.

13. An apparatus comprising:
one or more processors; and
memory storing computer processor executable instructions that, when executed by the one or more processors, cause the apparatus to:
determine, via one or more user devices of a plurality of user devices, user preference information associated with at least one preferred content item of a plurality of content items, wherein the plurality of user devices are in a common location;
determine, based on respective user preference information corresponding to each user device of the plurality of user devices at a first time, a highest ranked preferred content item of the plurality of content items and a second highest ranked preferred content item of the plurality of content items;
cause output of the highest ranked preferred content item to a quantity of output devices, wherein the quantity of output devices is determined based on the user preference information;
determine, at a second time later than the first time, and based on a change in the plurality of user devices at the common location, a new quantity of output devices;
and
cause output of at least one of: the highest ranked preferred content item or the second highest ranked preferred content item to the new quantity of output devices.

14. The apparatus of claim 13, wherein the processor executable instructions that, when executed by the one or more processors, cause the apparatus to determine the highest ranked preferred content item and the second highest ranked preferred content item cause the apparatus to determine a plurality of weight factors.

15. The apparatus of claim 13, wherein the processor executable instructions that, when executed by the one or more processors, cause the apparatus to determine the highest ranked preferred content item and the second highest ranked preferred content item cause the apparatus to determine the highest ranked preferred content item and the second highest ranked preferred content item based on a content type and a content status of each content item of the plurality of content items.

16. The apparatus of claim 13, wherein the processor executable instructions that, when executed by the one or more processors, cause the apparatus to cause output of the highest ranked preferred content item to the quantity of output devices cause the apparatus to cause output of the highest ranked preferred content item based on at least one output parameter, wherein the at least one output parameter comprises at least one of: size, shape, resolution, color, spatial coordinates, direction, or position.

17. A system comprising:
one or more output devices; and
a computing device comprising,
  one or more processors, and
  memory storing computer processor executable instructions that, when executed by the one or more processors, cause the computing device to:
    determine, via one or more user devices of a plurality of user devices, user preference information associated with at least one preferred content item of a plurality of content items, wherein the plurality of user devices are in a common location;
    determine, based on respective user preference information corresponding to each user device of the plurality of user devices at a first time, a highest ranked preferred content item of the plurality of content items and a second highest ranked preferred content item of the plurality of content items;
    cause output of the highest ranked preferred content item to a quantity of output devices, wherein the quantity of output devices is determined based on the user preference information;
    determine, at a second time later than the first time, and based on a change in the plurality of user devices at the common location, a new quantity of output devices;
    and
    cause output of at least one of the highest ranked preferred content item or the second highest ranked preferred content item to the new quantity of output devices.

18. The system of claim 17, wherein the processor executable instructions that, when executed by the one or more processors, cause the computing device to determine the highest ranked preferred content item and the second highest ranked preferred content item cause the computing device to determine a plurality of weight factors.

19. The system of claim 17, wherein the processor executable instructions that, when executed by the one or more processors, cause the computing device to determine the highest ranked preferred content item and the second highest ranked preferred content item is further based on a content type and a content status of each content item of the plurality of content items.

20. The system of claim 17, wherein the processor executable instructions that, when executed by the one or more processors, cause the computing device to cause output of the highest ranked preferred content item to the quantity of output devices cause the computing device to cause output of the highest ranked preferred content item based on at least one output parameter, wherein the at least one output parameter comprises at least one of: size, shape, resolution, color, spatial coordinates, direction, or position.

* * * * *